Figure 1:
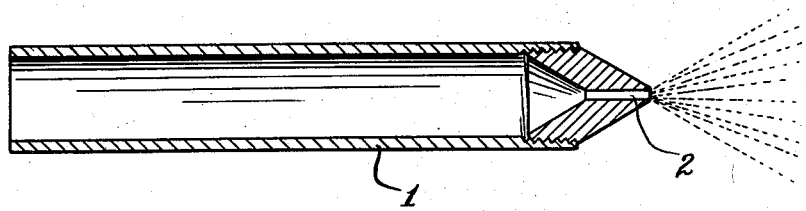

April 7, 1959 W. J. SMYTHE 2,881,141
METHOD OF PRODUCING A CELLULAR STRUCTURE
FROM A PLASTICIZED VINYL ESTER RESIN
Filed March 8, 1954

INVENTOR.
William J. Smythe
BY
Emery, Varney, Whittemore & Dix
ATTORNEYS

2,881,141

METHOD OF PRODUCING A CELLULAR STRUCTURE FROM A PLASTICIZED VINYL ESTER RESIN

William J. Smythe, Ridgewood, N.J., assignor, by mesne assignments, to Union Carbide Corporation, New York, N.Y., a corporation of New York Application March 8, 1954, Serial No. 414,561

3 Claims. (Cl. 260—2.5)

This invention relates to methods of producing a cellular structure in an uncured plasticized vinyl ester resin which may be used to produce a final cured product having a cellular structure commonly referred to as "sponge" or "foam." It pertains more particularly to methods of increasing the uniformity of the cellular structure.

In Schwencke Patent No. 2,666,036, dated January 12, 1954, and in Smythe and Muller application Serial No. 408,434, filed February 5, 1954, methods of making vinyl resin foams are disclosed in which the vinyl resins are subjected to an inert gas, preferably carbon dioxide, under pressure to cause the resins to absorb gas, and the gas impregnated resins are subsequently discharged under the influence of the applied pressure through a nozzle in the form of an expanded, creamy foam.

In the practice of these methods, it has commonly been believed that it was disadvantageous to discharge the resins at high pressures through a nozzle having a small orifice because it was believed that under these conditions the force of the discharge and the shear forces applied to the material at the point of discharge would destroy, or at least, deteriorate the foam. Accordingly, various expedients were adopted to cause the material to be discharged from the nozzle in the form of a continuous stream of foam. Thus, the pressure was lowered or a large orifice was used, or in some cases the material was passed through a long tube in which a gradual drop in pressure took place before discharge through a relatively large orifice.

It has long been observed, however, that when discharged in this manner, the cellular structure of the foam was non-uniform and in most cases cured articles produced from such foam exhibited random cells or bubbles which were much larger than the majority. This is highly undesirable for many reasons. For example, in the manufacture of sheet stock, it is customary to form a relatively thick slab which is subsequently split into thinner sections having a thickness from about $\frac{1}{16}''$ to about $\frac{1}{4}''$. Whenever, as frequently happens, the diameter of such random cells exceeds or even approaches the thickness of the sheet stock, the portion of the sheet containing such cells must be discarded. Moreover, such large cells result in lack of uniformity of compression resistance in finished articles. They also result in surface imperfections which affect the feel, smoothness and appearance of the finished article. In all respects, a finished article having a uniform cell structure is to be preferred.

It is an object of the present invention to increase the uniformity of the cell structure of the discharged foam.

Other objects and advantages of the invention will appear hereinafter.

A preferred embodiment of apparatus suitable for practicing the invention is shown in the accompanying drawings, in which Figure 1 is a longitudinal section through a single stage discharge nozzle.

Figure 2:
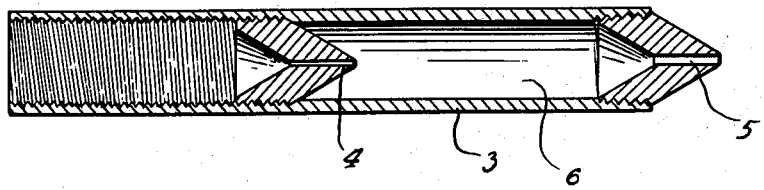

Figure 2 is a similar section through a two stage discharge nozzle.

According to the present invention, the resins which have been caused to absorb gas under pressure are subsequently discharged under conditions such that they are sprayed or atomized, i. e. broken up into small, individual, separated droplets. This is preferably accomplished by discharging the gas impregnated resins through an orifice at a pressure which is still sufficient, at the point of discharge, notwithstanding any drop in pressure which may have occurred prior thereto, to cause said resins to issue from the orifice in the form of small, individual, separated droplets. The said droplets when subsequently collected together form a creamy expanded foam substantially similar to that discharged by previous methods, but has a more uniform cell structure. Very surprisingly, the density of foam discharged in this manner is approximately the same as that of foam formed under similar conditions but discharged by previous methods, and the cellular structure of the foam is stable and remarkably uniform. Moreover, in filling molds with foam discharged in this manner, or even in making sheet stock or in other applications where the foam is deposited on a flat surface, entrapment of air or gas is much less likely to occur, and the quality of the finished product is much improved.

These results are characterized as surprising for the reason that they are contrary to all previous experience with foams such as rubber latex foams and the like, prior to curing the same. In working with such foams, it has long been observed that they must be carefully handled if collapse of the foam is to be avoided. This is also true of vinyl resin foams, for it has been observed that mere stirring will cause collapse of the cells of uncured foam. By all experience and logic, therefore, it appeared that the violence of the forces required to discharge the foam in the form of small, individual, separated droplets was to be avoided if the foam was to be preserved. The reasons why the collapse which might reasonably be expected does not occur when the foam is thus discharged, or why the uniformity of the cell structure of the foam is greatly improved are not entirely clear, but the following considerations may be involved.

In the case of vinyl resin foams in which gas has been absorbed by the resins under pressure, any subsequent reduction of pressure will result in a release of some of the absorbed gas. Whenever such reduction of pressure occurs before the material is discharged to atmospheric pressure, the released gas forms small cells or bubbles, some of which, if the material is thereafter discharged in a continuous stream, tend to expand and agglomerate or coalesce to form larger cells or bubbles. If, on the other hand, the material is sprayed or atomized, i. e. discharged in the form of small, individual, separated droplets, any gas which has been released prior to discharge is dissipated at the point of discharge. The gas retained in the individual droplets, and which is, of course, released subsequently, is not again subjected to a change in pressure, and is probably released relatively slowly and uniformly.

Referring to the drawings, two types of nozzles are illustrated which have been found satisfactory to discharge the resins in the form of small, individual separated droplets. Thus, a single stage discharge nozzle is illustrated in Fig. 1 in which the gas impregnated resin, under pressure, moves through the tubular portion 1 and is discharged through a small orifice 2. In Fig. 2, a two stage nozzle is illustrated, in which the tube 3 is provided with orifices 4 and 5 through which the material moves successively. The orifice 5 is larger than the orifice 4, and under these conditions the discharge of the material through the orifice 4 into the chamber 6 results in a reduction of pressure and a partial release of gas, and the discharge through the orifice 5, as before, causes the material to issue in the form of small, individual, separated droplets. With the two stage nozzle, however, it is found that satisfactory atomization can be obtained when using lower pressures than are required with the nozzle of Fig. 1. It has advantages, therefore, in some operations.

The method herein described is applicable to polyvinyl chloride and to copolymers of vinyl chloride and vinyl acetate. These may be plasticized as described in U.S. Patent No. 2,666,036, for example, or by other methods known in the art, and the plasticized resins may be caused to absorb gas under pressure as described in said patent or as described in Smythe and Muller application Serial No. 408,434, above referred to, or by any other process in which the vinyl resins are subjected to gas under pressure.

As a specific example of the practice of the process, the following may be considered:

Example

| | Parts |
|---|---|
| Aluminum Stearate (free fatty acid content 7.5 to 10%) | 1.5 |
| Dioctyl phthalate | 12 |
| Tri-cresyl phosphate | 138 |
| Resin (85% polyvinyl chloride and 15% polyvinyl acetate) | 100 |

The aluminum stearate is first dispersed in the dioctyl phthalate and the mixture is then heated slowly to a temperature of approximately 230° F. while stirring constantly. At this temperature the stearate melts and blends thoroughly with the plasticizer, and if the mixture is held at this temperature for a period of ten to fifteen minutes, thorough blending is assured. The mixture is then allowed to cool to room temperature. While cooling a gel structure develops in the mixture and at room temperature the mixture takes the form of a heavy gel. This gel is then mixed with the tricresyl phosphate and the resulting mixture is then combined with the resin. Any suitable kind of mixing or milling equipment may be used for these mixing operations. The resulting product will be a creamy, free flowing liquid which is readily pourable. In a batch process this mixture is then placed in a closed container and carbon dioxide is introduced under pressure until the pressure in the container reaches approximately 100 to 800 lbs. per sq. in., depending on the properties desired. The contents of the container may now be agitated as by turning the container end over end, while always maintaining the material at a temperature below gelling temperature. Thereafter the resin is discharged through an atomizing nozzle, as previously described. In a continuous process, the mixture is pumped continuously into the container in which the desired gas pressure and the desired temperature is maintained, and is discharged continuously through the atomizing nozzle.

It will be understood that the invention may be variously modified and embodied within the scope of the subjoined claims.

I claim as my invention:

1. In a method of producing a cellular structure in a polymerized material from the group consisting of polyvinyl chloride and copolymers of vinyl chloride and vinyl acetate dispersed in sufficient plasticizer to provide a free flowing mass, in which the plasticized material is subjected to an inert gas under pressure and is thereby impregnated with gas, the step which consists of discharging the gas impregnated resin through such an orifice at a gas pressure sufficient to cause said resin to issue from the orifice in the form of small, individual, separated, droplets, which when subsequently collected together form a creamy, expanded foam of substantially uniform cellular structure from which unabsorbed gas has been dissipated at the point of discharge.

2. The method set forth in claim 1 in which, prior to discharging the gas impregnated material through said orifice, the pressure applied thereto is substantially reduced to cause a partial release of gas absorbed therein.

3. The method set forth in claim 1 in which, prior to discharging the gas impregnated material through said orifice, said material is passed through an orifice of smaller size so that the pressure on said material is substantially reduced prior to discharge through said first orifice.

References Cited in the file of this patent

UNITED STATES PATENTS

| | | |
|---|---|---|
| 1,977,325 | Pfaunkuch | Oct. 16, 1934 |
| 2,549,864 | Toulmin | Apr. 24, 1951 |
| 2,666,036 | Schwencke | Jan. 12, 1954 |

OTHER REFERENCES

Chemical Engineers' Handbook, 34th edition, 1950, McGraw-Hill, pages 840, 841 and 845.